US012783790B2

(12) United States Patent
Kim et al.

(10) Patent No.: US 12,783,790 B2
(45) Date of Patent: Nov. 3, 2026

(54) METHOD AND SYSTEM FOR PROVIDING EDIT SERVICE OF DOCUMENT

(71) Applicant: SAMSUNG SDS CO., LTD., Seoul (KR)

(72) Inventors: Da Yeon Kim, Seoul (KR); Tae Hwang Yoo, Seoul (KR); Ji Won Ok, Seoul (KR); Bin Na Lee, Seoul (KR); Jong In Im, Seoul (KR); Kyu Bum Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 630 days.

(21) Appl. No.: 18/204,066

(22) Filed: May 31, 2023

(65) Prior Publication Data

US 2023/0385533 A1 Nov. 30, 2023

(30) Foreign Application Priority Data

May 31, 2022 (KR) ........................ 10-2022-0066553

(51) Int. Cl.
*G06F 3/048* (2013.01)
*G06F 40/166* (2020.01)
*G06F 40/197* (2020.01)

(52) U.S. Cl.
CPC .......... *G06F 40/166* (2020.01); *G06F 40/197* (2020.01)

(58) Field of Classification Search
CPC ..... G06F 40/166; G06F 40/197; G06F 40/194
USPC .......................................................... 715/229
See application file for complete search history.

(56) References Cited

U.S. PATENT DOCUMENTS

| | | | |
|---|---|---|---|
| 7,249,314 B2 | 7/2007 | Walker et al. | |
| 7,769,810 B1 | 8/2010 | Kaufman | |
| 8,738,706 B1 | 5/2014 | Grieve et al. | |
| 9,218,102 B1 * | 12/2015 | Greenspan | G06F 3/0481 |
| 9,471,556 B2 | 10/2016 | Little et al. | |
| 10,235,533 B1 | 3/2019 | Thoren et al. | |
| 11,270,069 B1 * | 3/2022 | Johnson | G06F 3/048 |
| 12,363,124 B2 * | 7/2025 | Gupta | G06F 16/93 |
| 12,632,468 B2 * | 5/2026 | Vess | G06F 16/178 |

(Continued)

FOREIGN PATENT DOCUMENTS

| | | |
|---|---|---|
| JP | 5011965 B2 | 8/2012 |
| KR | 10-2013-0126901 A | 11/2013 |

(Continued)

OTHER PUBLICATIONS

Communication issued Sep. 22, 2023 by the European Patent Office in counterpart European Patent Application No. 23175979.6.

(Continued)

*Primary Examiner* — David Phantana-angkool
(74) *Attorney, Agent, or Firm* — Sughrue Mion, PLLC

(57) ABSTRACT

Provided is a method for providing an edit service of a document, performed by at least one processor. The method includes storing, in a first data queue, first edit data received from a first communication terminal; storing, in the first data queue, second edit data received from a second communication terminal; updating an online document by reflecting the first edit data and the second edit data stored in the first data queue in the online document; transmitting the first edit data to the second communication terminal; and transmitting the second edit data to the first communication terminal.

17 Claims, 14 Drawing Sheets

(56) References Cited

U.S. PATENT DOCUMENTS

| | | | | |
|---|---|---|---|---|
| 2005/0078642 | A1* | 4/2005 | Mayer | H04L 65/1094 370/352 |
| 2009/0098894 | A1 | 4/2009 | Dudley et al. | |
| 2014/0280463 | A1* | 9/2014 | Hunter | G06F 40/166 709/203 |
| 2014/0280522 | A1 | 9/2014 | Watte | |
| 2015/0188978 | A1* | 7/2015 | Petculescu | H04L 67/02 709/217 |
| 2017/0359444 | A1* | 12/2017 | To | H04L 67/1095 |
| 2019/0179876 | A1* | 6/2019 | Zhang | G06F 40/106 |
| 2020/0356624 | A1* | 11/2020 | Cai | G06Q 10/101 |
| 2023/0385533 | A1* | 11/2023 | Kim | G06F 40/166 |

FOREIGN PATENT DOCUMENTS

| | | | |
|---|---|---|---|
| KR | 10-1750429 | B1 | 6/2017 |
| KR | 10-2017-0135011 | A | 12/2017 |
| KR | 10-1926566 | B1 | 12/2018 |
| KR | 10-1950422 | B1 | 2/2019 |
| KR | 10-2020-0001139 | A | 1/2020 |
| KR | 10-2064372 | B1 | 1/2020 |
| KR | 10-2021-0147566 | A | 12/2021 |
| WO | 2017/100021 | A1 | 6/2017 |

OTHER PUBLICATIONS

Communication issued Mar. 18, 2024 by the European Patent Office in European Application No. 23175979.6.

Communication dated Sep. 29, 2025, issued by the Vietnamese National Office of Intellectual Property in Vietnamese Application No. 1-2023-03561.

Communication issued Aug. 21, 2026 in Korean Patent Application No. 10-2022-0066553 from the Korean Intellectual Property Office.

* cited by examiner

<RELATED ART>

1210

1220

METHOD AND SYSTEM FOR PROVIDING EDIT SERVICE OF DOCUMENT

CROSS-REFERENCE TO RELATED APPLICATION

This application claims priority from Korean Patent Application No. 10-2022-0066553 filed on May 31, 2022 in the Korean Intellectual Property Office and all the benefits accruing therefrom under 35 U.S.C. 119, the contents of which in its entirety are herein incorporated by reference.

BACKGROUND

Technical Field

The present disclosure relates to a method for providing an edit service of a document, and more particularly, to a method and system for providing an edit service of a document to support a plurality of editors to simultaneously edit an online document.

Description of the Related Art

Nowadays, an edit service of a document is provided, which stores the document in a server or an external device and supports a plurality of users to simultaneously edit the document. Since the edit service of the document should continuously receive edit data from editors who are editing the same document, the editors who edit the same document should be connected to the same server.

FIG. 1 is a view illustrating a system environment in which a conventional edit service of a document is provided. As shown in FIG. 1, servers, which support editing for document #1 and document #2, may be different from each other. That is, a server 1 10 may be in charge of editing for the document #1, and a server 2 20 may be in charge of editing for the document #2. Each of the servers 10 and 20 may update the document #1 or the document #2, which is stored in a database 30, so that changed details (i.e., edit details) for the document #1 or the document #2 are reflected.

However, as shown in FIG. 1, a plurality of editors may edit the document #1. In this case, a load for the server 1 10 may be weighted, whereby a failure may occur in the server 1 10. When a failure occurs in the server 1 10 while editing of the document #1 is being performed, edit data for the document #1 may be lost. In addition, since resources for the server 2 20 remain relatively, load may be concentrated on the server 1 10 without being distributed in view of the entire system. In addition, in the system structure shown in FIG. 1, scale-out cannot be performed even without service interruption.

Therefore, a system for stably supporting document editing and facilitating scale-out is required.

SUMMARY

An object of the present disclosure is to provide a method and system for providing an edit service of a document to support a plurality of editors to stably edit the document and reflect changed data in the document.

Another object of the present disclosure is to provide a method and system for providing an edit service of a document to stably support document editing without loss of data even though a failure occurs in some modules due to dualization of modules included in the system.

Other object of the present disclosure is to provide a system capable of performing scale-out even without interruption of its operation.

The objects of the present disclosure are not limited to those mentioned above and additional objects of the present disclosure, which are not mentioned herein, will be clearly understood by those skilled in the art from the following description of the present disclosure.

According to an aspect of an example embodiment, there is provided a method for providing an edit service of a document, performed by at least one processor, the method including: storing, in a first data queue, first edit data received from a first communication terminal; storing, in the first data queue, second edit data received from a second communication terminal; updating an online document by reflecting the first edit data and the second edit data stored in the first data queue in the online document; transmitting the first edit data to the second communication terminal; and transmitting the second edit data to the first communication terminal.

The updating the online document may include: merging the first edit data and the second edit data into one edit data; and reflecting the merged edit data in the document.

The updating the online document may include storing the first edit data and the second edit data in a second data queue based on the updating of the online document being completed, each of the first edit data and the second edit data being stored in association with editor identification information; among the edit data stored in the second data queue, the second edit data that is not associated with an editor of the first communication terminal is transmitted to the first communication terminal; and among the edit data stored in the second data queue, the first edit data that is not associated with an editor of the second communication terminal is transmitted to the second communication terminal.

The first data queue may be a reception-only queue in which received edit data are stored, and the second data queue may be a transmission-only queue in which edit data are stored before being transmitted to a communication terminal.

The first data queue may store the first edit data and the second edit data in association with identification information of the document, and the updating the online document may include: acquiring the first edit data and the second edit data from the first data queue based on identification information of the document; and reflecting the first edit data and the second edit data in the document.

The storing the first edit data in the first data queue may include storing the first edit data in a sub-queue corresponding to the identification information of the document among a plurality of sub-queues included in the first data queue, and the storing the second edit data in the first data queue may include storing the first edit data in the sub-queue.

According to an aspect of an example embodiment, there is provided a document management system for providing an edit service of an online document, the document management system including at least one processor to implement: at least one transmission/reception module configured to receive edit data from at least one communication terminal; a queue processing module configured to store, in a first data queue and a second data queue, edit data received by the at least one transmission/reception module; and at least one update module configured to acquire edit data stored in the first data queue, reflect the acquired edit data in the online document, and store edit data, which has been reflected in the online document, in the second data queue, wherein the at least one transmission/reception module is configured to transmit the edit data stored in the second data queue to the at least one communication terminal.

The at least one transmission/reception module may include a first transmission/reception module configured to communicate with a first communication terminal, and a second transmission/reception module configured to communicate with a second communication terminal; and based on a failure occurring in the second transmission/reception module, the first transmission/reception module may be configured to receive edit data associated with a second editor from the second communication terminal and stores the received edit data in the first data queue.

The first transmission/reception module may be configured to, based on the failure occurring in the second transmission/reception module: receive, from the second communication terminal, an index related to the edit data received by the second communication terminal, acquire edit data, which is to be transmitted, from the second data queue based on the received index, and transmit the edit data, acquired based on the received index, to the second communication terminal.

The second data queue may store the edit data associated with the second editor, which has been reflected in the online document, and the first transmission/reception module may be configured to acquire the edit data associated with the second editor from the second data queue, and transmit the acquired edit data associated with the second editor to the first communication terminal.

The at least one update module may include a first update module configured to process edit data of a first document stored in the first data queue, and a second update module configured to process edit data of a second document stored in the first data queue; and based on a failure occurring in the second update module, the first update module may be configured to acquire the edit data of the second document from the first data queue.

The first data queue may include a first sub-queue associated with the first document and a second sub-queue associated with the second document, and based on edit data stored in the first sub-queue being not processed for a threshold time period, it may be determined that a failure has occurred in the first update module.

According to an aspect of an example embodiment, there is provided a document management system for providing an edit service of an online document, the document management system including at least one processor to implement: a first transmission/reception module configured to receive edit data from a plurality of communication terminals; a queue processing module configured to store the received edit data; an update module configured to acquire the edit data stored in the queue processing module and reflect the acquired edit data in an online document; and a second transmission/reception module newly added by scale-out, wherein a second group including at least one communication terminal allocated to the second transmission/reception module among the plurality of communication terminals is determined, the first transmission/reception module is configured to receive edit data from a communication terminal of a first group excluding the second group among the plurality of communication terminals, and the second transmission/reception module is configured to receive edit data from the communication terminal of the second group.

The first transmission/reception module may be configured to release a session with at least one communication terminal included in the second group, and the second transmission/reception module may be configured to establish a session with the at least one communication terminal included in the second group.

The first transmission/reception module may be configured to transmit a session switching request message, which includes identification information of the second transmission/reception module, to the at least one communication terminal included in the second group.

The update module may be configured to reflect edit data of the first group, which is received from the communication terminal of the first group, in the online document, and store the edit data of the first group, which has been reflected in the online document, in a second data queue included in the queue processing module; and the second transmission/reception module may be configured to acquire the edit data of the first group from the second data queue and transmit the acquired edit data of the first group to at least one communication terminal included in the second group.

According to an aspect of an example embodiment, there is provided a document management system for providing an edit service of an online document, the document management system including at least one processor to implement: a transmission/reception module configured to receive edit data from a plurality of communication terminals; a queue processing module configured to store the received edit data; a first update module configured to acquire edit data for a plurality of documents, which are stored in the queue processing module, and reflect the acquired edit data in each document stored in a database; and a second update module newly added by scale-out, wherein a second group, which includes at least one document allocated to the second update module among the plurality of documents, is determined, the first update module is configured to acquire edit data of a first group, which is related to a document of the first group excluding the second group among the plurality of documents, from the queue processing module and reflect the acquired edit data of the first group in the document of the first group, and the second update module is configured to acquire edit data of the second group, which is related to a document of the second group among the plurality of documents, from the queue processing module and reflect the acquired edit data of the second group in the document of the second group.

The queue processing module may include at least one first sub-queue related to the document of the first group, and at least one second sub-queue associated with the document of the second group; the first update module may be configured to acquire the edit data of the first group by accessing the at least one first sub-queue; and the second update module may be configured to acquire the edit data of the second group by accessing the second sub-queue.

According to an aspect of an example embodiment, there is provided a computing system including: at least one processor; and at least one memory configured to store computer program, wherein the computer program is executable by the at least one processor to cause the at least one processor to perform: storing, in a first data queue, first edit data received from a first communication terminal; storing, in the first data queue, second edit data received from a second communication terminal; updating an online document by reflecting the first edit data and the second edit data stored in the first data queue in the online document; transmitting the first edit data to the second communication terminal; and transmitting the second edit data to the first communication terminal.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In describing the present disclosure, when it is determined that the detailed description of the related well-known configuration or function may obscure the gist of the present disclosure, the detailed description thereof will be omitted.

Figure 1:
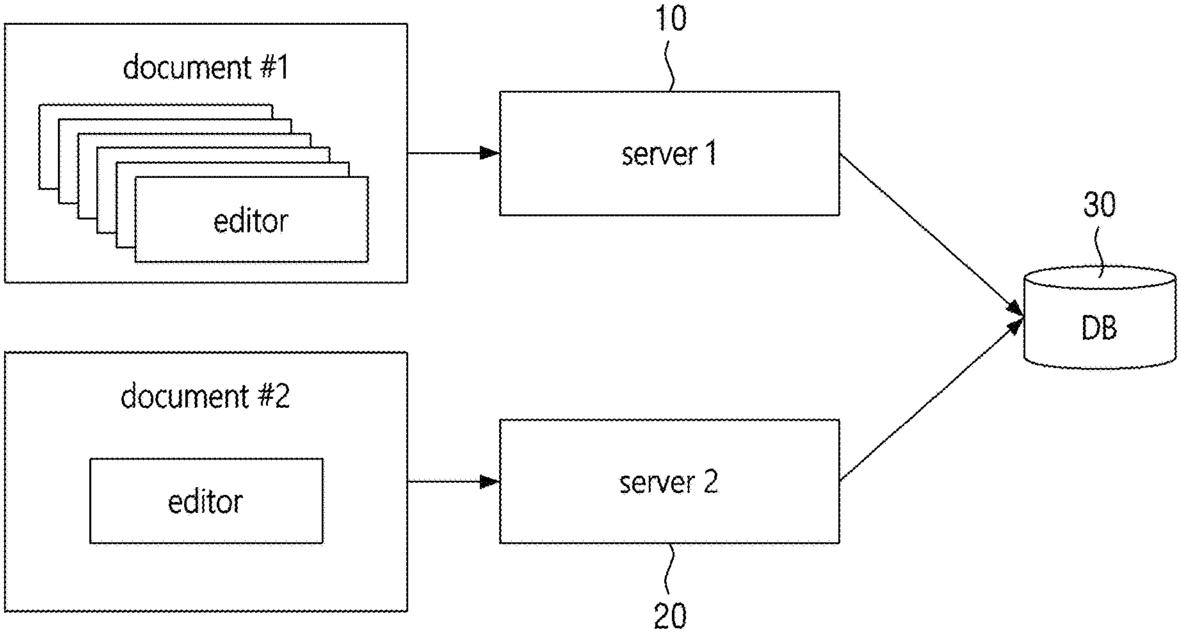
FIG. 1 is a view illustrating a system environment in which a conventional edit service of a document is provided.
Figure 2:
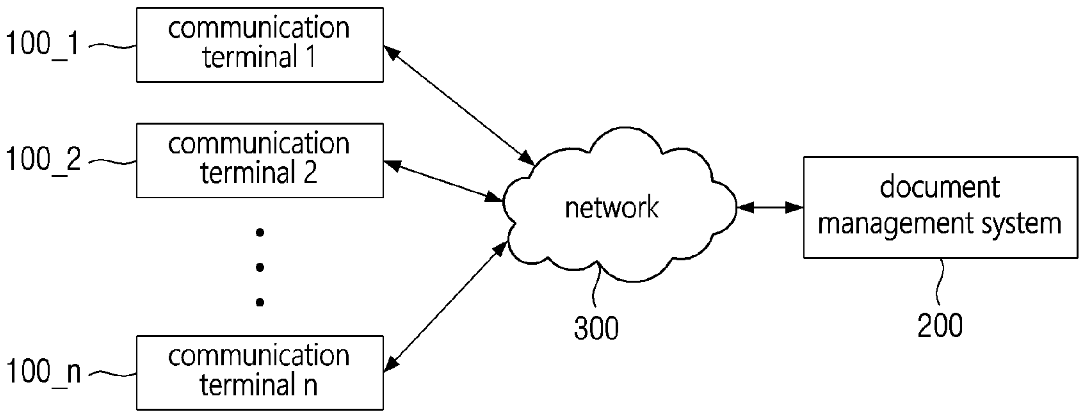
FIG. 2 is a schematic view illustrating a document edit service system according to one embodiment of the present disclosure.

Hereinafter, embodiments of the present disclosure will be described with reference to the attached drawings:

FIG. 2 is a schematic view illustrating a document edit service system according to one embodiment of the present disclosure.

As shown in FIG. 2, a document management system 200 and each of communication terminals 100_1 to **100_*n* may communicate with each other through a network 300. In this case, the network 300** includes a mobile communication network, a wired communication network and a short-range communication network, and corresponds to a well-known or commonly used art, and thus its detailed description will be omitted in the present disclosure.

The communication terminals 100_1 to **100_*n* are computing devices such as a personal computer, a server, and a mobile communication terminal, and may communicate with the document management system 200 through the network 300. The communication terminals 100_1 to 100_*n* may be terminals owned by a document editor. According to one embodiment, after forming a session with the document management system 200, the communication terminals 100_1 to 100_*n* may receive a document to be edited from the document management system 200** and edit the received document.

The document management system 200 may be at least one computing system for storing and managing documents. The document management system 200 may provide an edit service of a document to the communication terminals 100_1 to **100_*n*. The document management system 200 may support the plurality of communication terminals 100_1 to 100_*n* to edit the same document. To this end, the document management system 200** may support various modules, as described below, to support a stable document management service.

Figure 3:
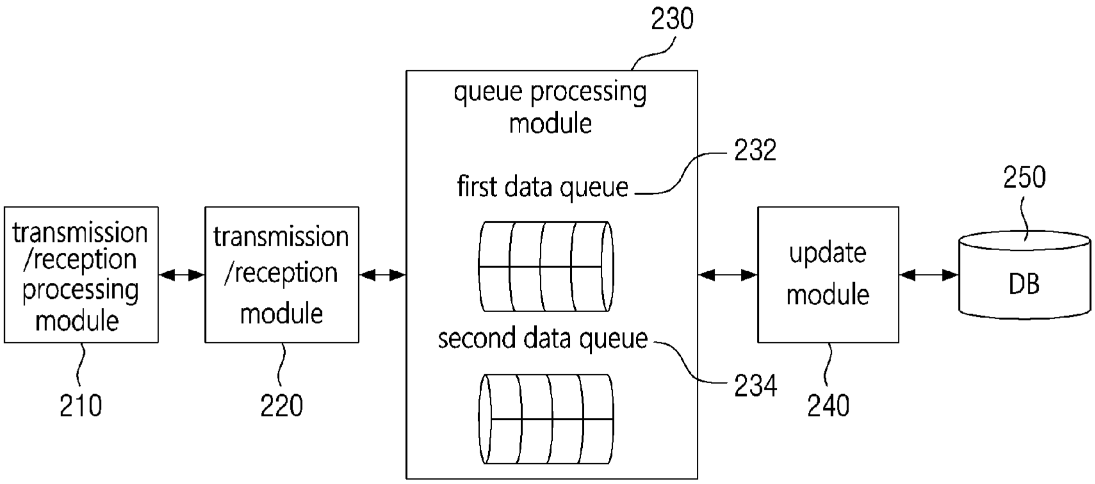
FIG. 3 is a view illustrating an internal configuration of a document management system of FIG. 2.

FIG. 3 is a view illustrating an internal configuration of a document management system of FIG. 2.

As shown in FIG. 3, the document management system may include a transmission/reception processing module 210, a transmission/reception module 220, a queue processing module 230, an update module 240, and a database 250. Each module illustrated in FIG. 3 may be implemented as a physical entity or a logical entity. In addition, two or more modules may be implemented to be integrated into one module. In some embodiments, each module may be implemented in the form of a virtual machine and mounted to a cloud computing system.

The database 250 may store a plurality of documents as a storage means. In this case, the document may be an online document in which editing is performed through online editing.

The transmission/reception processing module 210 may transmit edit data received from the network 300 to the transmission/reception module 220. For example, the transmission/reception processing module 210 may transmit the edit data received from the communication terminals 100_1 to **100_*n* to the transmission/reception module 220. When a plurality of transmission/reception modules 220 are provided, the transmission/reception processing module 210** may perform load balancing for traffic generated by the transmission/reception module 220.

In one embodiment, the transmission/reception processing module 210 may distribute and transmit the edit data received from the network 300 to each of the plurality of transmission/reception modules, based on a physical or logical port. For example, the transmission/reception processing module 210 may transmit edit data included in port numbers ranging from 1 to n (where, n is a natural number) to the first transmission/reception module, and may transmit edit data included in port numbers ranging from n+1 to m (m is a natural number greater than n+1) to the second transmission/reception module. In another embodiment, the transmission/reception processing module 210 may distribute and transfer the edit data received from the network 300 to each of the plurality of transmission/reception modules based on document identification information (for example, document ID). For example, the transmission/reception processing module 210 may transmit edit data related to document corresponding to identification information from 1 to n (where, n is a natural number) to the first transmission/reception module, and may transmit edit data related to document corresponding to identification information from n+1 to m (m is a natural number greater than n+1) to the second transmission/reception module.

The transmission/reception module 220 may store edit data acquired from the transmission/reception processing module 210 in a first data queue 232. In one embodiment, the edit data received by the transmission/reception module 220 may be stored in the first data queue 232. In addition, the transmission/reception module 220 may transmit edit data stored in a second data queue 234 to a destination by using the transmission/reception processing module 210. According to one embodiment, the transmission/reception module 220 may extract the data stored in the second data queue 234 in a first-in-first-out manner and transmit the extracted data to the destination.

The queue processing module 230 may include a first data queue 232 in which received edit data is stored, and a second data queue 234 in which edit data to be transmitted is stored, as data storage means. That is, the first data queue 232 may be a reception-only queue, and the second data queue 234 may be a transmission-only queue.

The first data queue 232 may store edit data prior to being reflected in a document. According to one embodiment, the first data queue 232 may store edit data including document identification information, editor identification information (i.e., user identification information), and an index of edit data. According to another embodiment, the first data queue 232 may store edit data in association with the document identification information, the editor identification information, and the index of edit data. In this case, the index may indicate identification information of each edit data for a corresponding document. For example, index '1' may be assigned to first edit data for the document, and index '2' may be assigned to second edit data for the document.

The second data queue 234 may store at least one edit data reflected in the document. According to one embodiment, the second data queue 234 may store edit data including the document identification information, the editor identification information, and the index of edit data.

In some embodiments, at least one of the first data queue 232 or the second data queue 234 may include a sub-data queue for each document. In this case, the sub-data queue is a dedicated queue in which a document is stored, and for example, edit data related to a first document may be stored in a first queue (i.e., a first sub-queue), and edit data related to a second document may be stored in a second queue (i.e., a second sub-queue).

The update module 240 may acquire at least one edit data for a document stored in a first data queue 232 and reflect the acquired edit data to the document stored in the database 250. In one embodiment, the update module 240 may acquire a document corresponding to document identification information included in edit data from the database 250, and may update the document by reflecting at least one edit data in the acquired document. When the edit data is successfully reflected, the update module 240 may store the edit data in the second data queue 234.

Hereinafter, in the following embodiment, a terminal used by a user 1 is a communication terminal 1, and a terminal used by a user 2 is a communication terminal 2. That is, a terminal used by a user n is referred to as a communication terminal n. Also, a user is an editor who edits a document, and the user and the editor may be used interchangeably.

Figure 4:
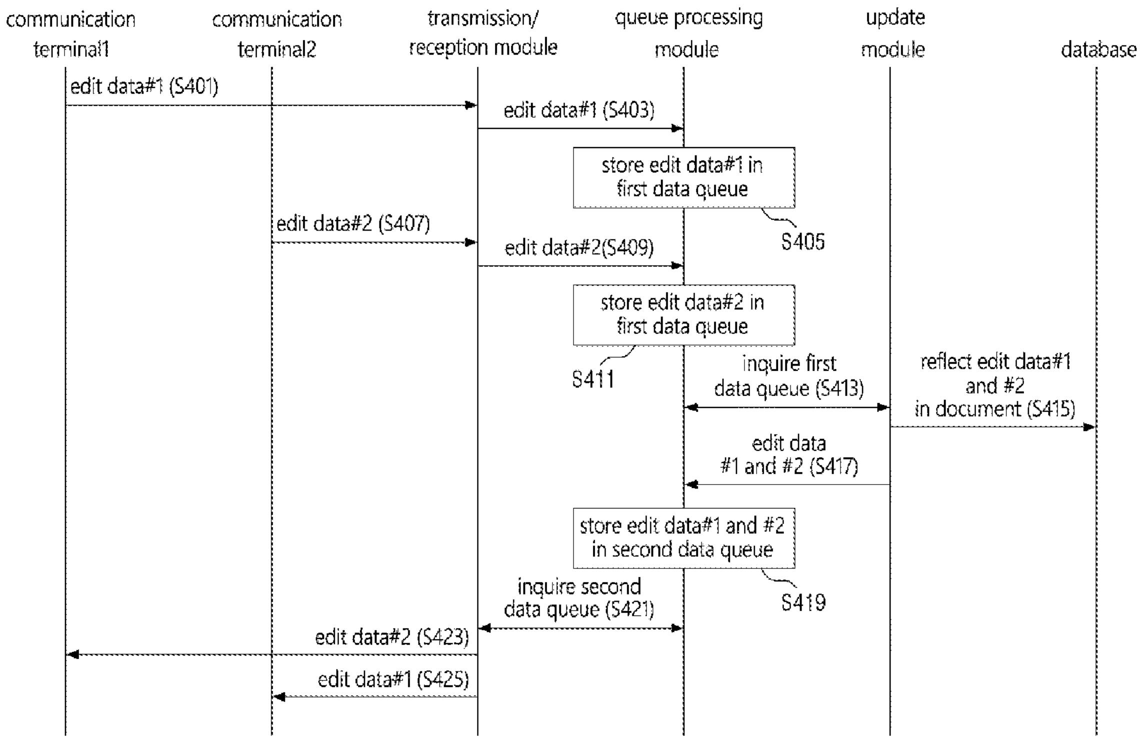
FIG. 4 is a signal flow chart illustrating a method for providing an edit service of a document in accordance with another embodiment of the present disclosure.

FIG. 4 is a signal flow chart illustrating a method for providing an edit service of a document in accordance with another embodiment of the present disclosure.

Referring to FIG. 4, the communication terminal 1 100_1 may transmit edit data 190 1 for document #1, which is generated during editing of the document #1, to the document management system 200 (S401). In this case, the edit data #1 may include identification information of the document #1 and identification information of an editor 1. The transmission/reception processing module 210 of the document management system 200 may transmit the edit data #1 to the transmission/reception module 220, and the transmission/reception module 220 may transmit the edit data #1 to the queue processing module 230 (S403). Then, the queue processing module 230 may assign an index of the edit data #1 and store the edit data #1 including the index, the identification information of the document #1, and the identification information of the editor 1 in the first data queue 232 (S405).

Also, the communication terminal 2 100_2 may transmit edit data #2 for the document #1, which is generated during editing of the document #1, to the document management system 200 (S407). In this case, the edit data #2 may include identification information of the document #1 and identification information of an editor 2. The transmission/reception processing module 210 of the document management system 200 may transmit the edit data #2 to the transmission/reception module 220, and the transmission/reception module 220 may transmit the edit data #2 to the queue processing module 230 (S409). Then, the queue processing module 230 may assign an index of the edit data #2 and store the edit data #2 including the index, the identification information of the document #1, and the identification information of the editor 2 in the first data queue 232 (S411).

In this way, in a state that the edit data #1 and the edit data #2, which are related to the document #1, are stored in the first data queue 232, the update module 240 may inquire and acquire the edit data related to the document #1 stored in the first data queue 232 (S413). At this time, the update module 240 may acquire the edit data #1 and the edit data #2 from the first data queue 232 as the data related to the document #1.

Subsequently, the update module 240 may update the document #1 by reflecting the edit data #1 and the edit data #2 in the document #1 stored in the database 250 (S415). In one embodiment, the update module 240 may merge the edit data #1 and the edit data #2 as one edit data, and may update the document #1 by reflecting the merged edit data in the document #1.

When the update for the document #1 is completed, the update module 240 may perform a process of storing the edit data #1 and the edit data #2 in the second data queue 234. According to one embodiment, the update module 240 may transmit the edit data #1 and the edit data #2 to the queue processing module 230 (S419), and the queue processing module 230 may store the edit data #1 and the edit data #2 in the second data queue 234. In another embodiment, the update module 240 may request the queue processing module 230 of queue movement for the edit data #1 and the edit data #2. In this case, the queue processing module 230 may acquire the edit data #1 and the edit data #2 from the first data queue 232, and may store the acquired edit data #1 and edit data #2 of the first data queue 232 in the second data queue 234.

In some embodiments, when the update for the document #1 is completed, the update module 240 may transmit an update completion message including the index of the edit data #1 and the index of the edit data #2 to the queue processing module 230. In this case, the queue processing module 230 may delete the edit data #1 and the edit data #2, which correspond to the corresponding index, from the first data queue 232, or may set each of the edit data #1 and the edit data #2 as a completed task. Therefore, among the edit data stored in the first data queue 232, edit data having an index of next order based on the index of the edit data #2 may be processed.

In response to storing the edit data #1 and the edit data #2 in the second data queue 234, the transmission/reception module 220 may inquire and acquire the edit data #1 and the edit data #2 for the document #1 from the second data queue 234 (S421). Subsequently, the transmission/reception module 220 may identify editor identification information included in each of the edit data #1 and the edit data #2.

The transmission/reception module 220 may transmit the edit data #2 to the communication terminal 1 100_1 except for the edit data #1 as the identification information of the editor 1 is included in the edit data #1 (S423). That is, the transmission/reception module 220 may transmit the edit data #2 to the communication terminal 1 100_1, which does not recognize occurrence of the edit data #2, without transmitting the edit data #1 to the communication terminal 1 100 1 that has transmitted the edit data #1. Therefore, the edit data #2 may be reflected in the document #1 that is being edited in the communication terminal 1 100_1, so that the edit data #2 may be updated. That is, since a local resource is used in the communication terminal 1 100_1 and thus the edit data #1 is already reflected therein, the edit data #2 generated by the editor 2 may be transmitted to the communication terminal 1 100_1 and reflected in the document #1.

The transmission/reception module 220 may transmit the edit data #1 to the communication terminal 2 100_2 except for the edit data #2 as the identification information of the editor 2 is included in the edit data #2 (S425). That is, the transmission/reception module 220 may transmit the edit data #1 to the communication terminal 2 100_2, which does not recognize occurrence of the edit data #1, without transmitting the edit data #2 to the communication terminal 2 100_2 that has transmitted the edit data #2. Therefore, the edit data #1 may be reflected in the document #1 that is being edited in the communication terminal 2 100_2, so that the edit data #1 may be updated. That is, since a local resource is used in the communication terminal 2 100_2 and thus the edit data #2 is already reflected therein, the edit data #1 generated by the editor 1 may be transmitted to the communication terminal 2 100_2 and reflected in the document #1.

The transmission/reception module 220 may transmit a transmission completion message including the index of the edit data #1 and the index of the edit data #2 to the queue processing module 230 when the edit data is successfully transmitted to each of the communication terminal 1 100_1 and the communication terminal 2 100_2. In this case, the queue processing module 230 may delete the edit data #1 and the edit data #2, which correspond to the corresponding index, from the second data queue 234, or may set each of the edit data #1 and the edit data #2 as a completed task. Therefore, among the edit data stored in the second data queue 234, edit data having an index of next order based on the index of the edit data #1 and #2 may be processed at next cycle.

Meanwhile, in some embodiments, the transmission/reception module 220 may transmit all edit data for the document #1 inquired from the second data queue 234 to the communication terminal 1 100_1 and the communication terminal 2 100_2 without selecting a transmission target of edit data.

According to the present embodiment, even though documents are simultaneously edited, edit data may be stably reflected in the documents. In addition, the received edit data may be stored in the first data queue 232, and edit data to be transmitted may be stored in the second data queue 234, so that the edit data may be reflected in the document without loss of the edit data.

Meanwhile, the transmission/reception module and the update module may be dualized.

Figure 5:
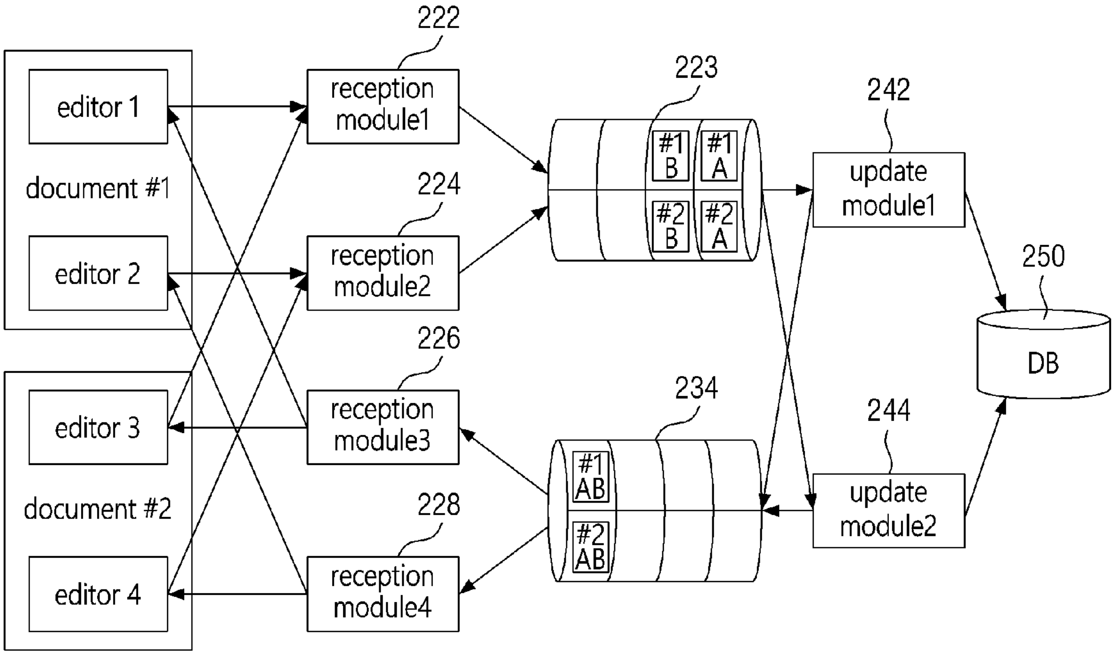
FIG. 5 is a view illustrating a document management system in which a transmission/reception module and an update module are dualized, in accordance with still another embodiment of the present disclosure.

FIG. 5 is a view illustrating a document management system in which a transmission/reception module and an update module are dualized, in accordance with still another embodiment of the present disclosure.

As illustrated in FIG. 5, the document management system according to still another embodiment of the present disclosure may include a plurality of reception modules 222 and 224, a plurality of transmission modules 226 and 228, a first data queue 132, a second data queue 234, a plurality of update modules 242 and 244, and a database 250. Additionally, the document management system may further include a transmission/reception processing module. In this case, the transmission/reception processing module may load-balance the received data and transmit the data to the respective reception modules 222 and 224. Although the transmission/reception module is illustrated as being divided into the reception modules 222 and 224 and the transmission modules 226 and 228 in FIG. 5, the present disclosure is not limited thereto, and the reception modules 222 and 224 and the transmission modules 226 and 228 may be integrated into a transmission/reception module.

When a failure occurs in any one of the reception modules 222 and 224, the reception module, which operates normally, may process the edit data on behalf of the reception module in which a failure occurs. Also, when a failure occurs in any one of the transmission modules 226 and 228, the transmission module, which operates normally, may transmit the edit data on behalf of the transmission module in which a failure occurs. In addition, when a failure occurs in any one of the update modules 242 and 244, the update module 242 or 244, which operates normally, may reflect the edit data in the document of the database 250 on behalf of the update module 242 or 244 in which a failure occurs.

FIG. 5 illustrates that edit data related to the editor 1 and an editor 3 are processed by the reception module 1 222 and the transmission module 1 226, and the edit data related to the editor 2 and an editor 4 are processed by the reception module 2 224 and the transmission module 2 228. A method for distributing data in accordance with scale-out of a specific module will be described in detail with reference to FIGS. 10 to 13.

Hereinafter, a method for responding to a failure after each module is dualized will be described.

Figure 6:
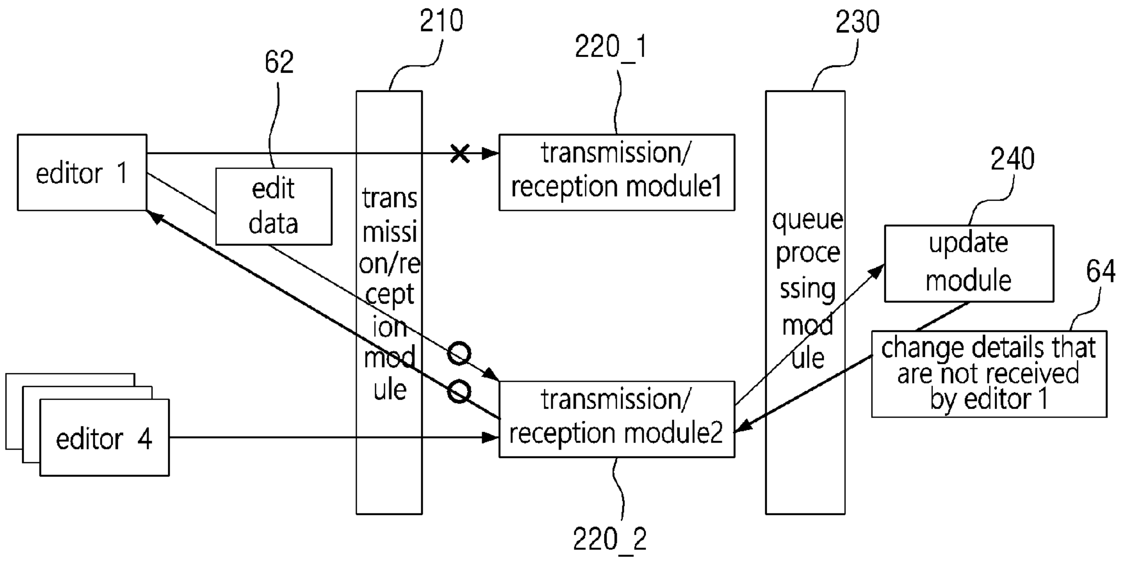
FIG. 6 is a view illustrating a document management system, which includes a dualized transmission/reception module, in accordance with still another embodiment of the present disclosure.

FIG. 6 is a view illustrating a document management system, which includes a dualized transmission/reception module, in accordance with still another embodiment of the present disclosure.

FIG. 6 illustrates that a failure occurs in the transmission/reception module 1 220_1 while the edit data generated by the editor 1 is being processed by the transmission/reception module 1 220_1 and the edit data generated by the editor 2 to the editor 4 is being processed by the transmission/reception module 2 220_2. In this way, when a failure occurs in the transmission/reception module 1 220_1, the transmission/reception processing module 210 may detect a failure of the transmission/reception module 1 220_1 and inform the transmission/reception module 2 220_2 of a failure occurrence of the transmission/reception module 1 220_1. When the transmission/reception processing module 210 does not receive a reception response to the transmitted edit data for a predetermined time after transmitting the edit data to the transmission/reception module 1 220_1, the transmission/reception processing module 210 may determine that a failure has occurred in the transmission/reception module 1 220_1.

When the failure of the transmission/reception module 1 220_1 occurs, edit data 62 generated by the editor 1 may be transmitted to the transmission/reception module 2 220_2. In this case, the transmission/reception module 2 220_2 may transmit the edit data 62 to the queue processing module 230 to store the edit data 62 in the first data queue 232 included in the queue processing module 230. In addition, the update module 240 may acquire the edit data 62 from the first data queue 232 and reflect the acquired edit data 62 in the document stored in the database 250 to update the document. Also, the transmission/reception module 2 220_2 may acquire, from the second data queue 234 of the queue processing module 230, edit details 64 that are not received by the editor 1 due to the failure of the transmission/reception module 1 220_1, and may provide the edit details 64 to the editor 1. In this case, the edit details 64 that are not received by the editor 1 may include edit data edited by the editors 2 to 4 while the failure of the transmission/reception module 1 220_1 occurs.

Figure 7:
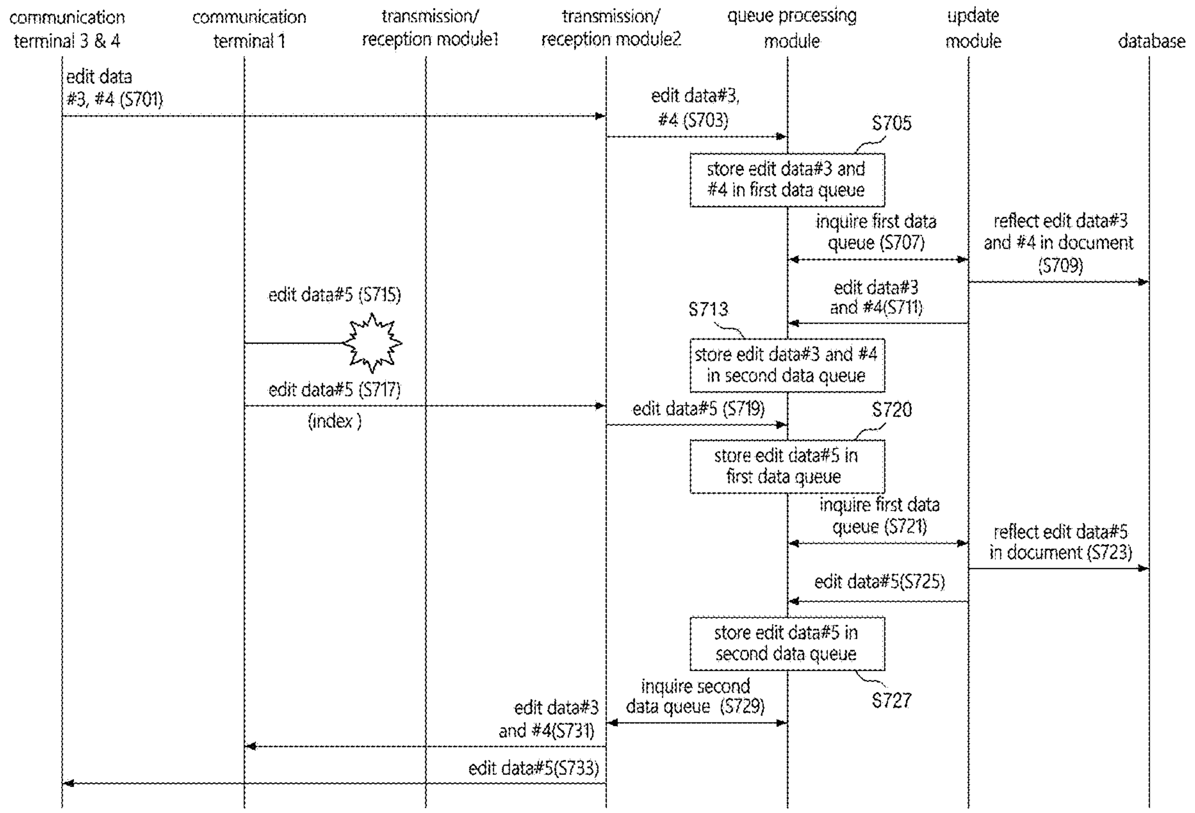
FIG. 7 is a signal flow chart illustrating the document management system of FIG. 6, which is operated by occurrence of a failure of a transmission/reception module, in accordance with still another embodiment of the present disclosure.

FIG. 7 is a signal flow chart illustrating the document management system of FIG. 6, which is operated by occurrence of a failure of a transmission/reception module, in accordance with still another embodiment of the present disclosure. In the description with reference to FIG. 7, it is assumed that a failure occurs in the transmission/reception module 1 220_1 while the communication terminal 1 communicates with the transmission/reception module 1 220 1 and the communication terminal 3 and the communication terminal 4 communicate with the transmission/reception module 2 220_2. In addition, it is assumed that all of the communication terminal 1, the communication terminal 3 and the communication terminal 4 perform editing for the same document, and data transmitted from the terminal to the transmission/reception module passes through the transmission/reception processing module 210.

Referring to FIG. 7, the communication terminal 3 may transmit edit data #3 to the transmission/reception module 1 220_1, and the communication terminal 4 may transmit edit data #4 to the transmission/reception module 2 220_2 (S701). Subsequently, the transmission/reception module 2 220_2 may transmit the edit data #3 and the edit data #4 to the queue processing module 230 (S703).

Next, the queue processing module 230 may store the edit data #3 and the edit data #4 in the first data queue (S705). In this case, the queue processing module 230 may store the edit data #3 in association with identification information of a user 3 and store the edit data #4 in association with identification information of a user 4. In addition, the queue processing module 230 may assign an index to each of the edit data #3 and the edit data #4 and store the index in the first data queue.

Subsequently, the update module 240 may acquire the edit data #3 and the edit data #4 from the first data queue by inquiring the first data queue (S707). Next, the update module 240 may update the document by reflecting the edit data #3 and the edit data #4 in the document stored in the database. In some embodiments, the update module 240 may merge the edit data #3 and the edit data #4 into one edit data, and then may reflect the merged edit data in the document. Therefore, the user 3 and the content edited by the user 3 may be reflected in the document.

Next, when the edit data #3 and the edit data #4 are completely updated, the update module 240 may perform a process of storing the edit data #3 and the edit data #4 in the second data queue 234 (S711 and S713). According to one embodiment, the update module 240 may directly access the second data queue 234 to store the edit data #3 and the edit data #4 in the second data queue 234. The edit data #3 may include identification information of the editor 3, and the edit data #4 may include identification information of the editor 4.

The communication terminal 1 may detect that a failure has occurred in transmission/reception module 1 220_1 while transmitting edit data #5 to transmission/reception module 1 220_1 (S715). For example, when the communication terminal 1 does not receive a response (e.g., ACK) to data reception from the transmission/reception module 1 220_1 for a threshold time period after transmitting the edit data #5 to the transmission/reception module 1 220_1, the communication terminal 1 may determine that a failure has occurred in the transmission/reception module 1 220_1.

In response to the occurrence of the failure of the transmission/reception module 1 220_1, the communication terminal 1 may transmit the edit data #5 and an index of edit data, which is received so far, to the transmission/reception module 2 220_2 (S717). In this case, it is described that the index of the edit data is an index (e.g., index #2) of the edit data #2.

Next, the transmission/reception module 2 220_2 may transmit the edit data #5 to the queue processing module 230 (S719). Subsequently, the queue processing module 230 may assign an index (e.g., index #5) of the edit data #5 and store the edit data #5, to which the index is assigned, in the first data queue (S720).

The update module 240 may acquire the edit data #5 by inquiring the first data queue (S721). Subsequently, the update module 240 may update the document stored in the database by reflecting the edit data #5 in the document (S723).

Next, when the edit data #5 is completely updated, the update module 240 may transmit the edit data #5 to the queue processing module 230 to store the edit data #5 in the second data queue (S725 and S727). The edit data #5 may include identification information of the editor 1.

Then, the transmission/reception module 2 220_2 may acquire the edit data #3 and the edit data #4, which are transmitted to the communication terminal 1, and the edit data #3 and the edit data #5, which are transmitted to the communication terminal 3 and the communication terminal 4, by inquiring the second data queue (S729). According to one embodiment, the transmission/reception module 2 220_2 may determine that edit data, which are not received in the communication terminal 1, the edit data #3 and the edit data #4, based on the index received from the communication terminal 1 in step S717. That is, the transmission/reception module 2 220_2 receives the edit data #3, the edit data #4 and the edit data #5, which are edit data having an index after the index received from the communication terminal 1, from the second data queue, wherein the edit data #5 may be excluded from a transmission target as the identification information of the editor 1 is included in the edit data #5.

Subsequently, the transmission/reception module 2 220_2 may transmit the edit data #3 and the edit data #4 to the communication terminal 1 (S731). Therefore, the communication terminal 1 may receive the edit data #3 and the edit data #4, which are not received due to the failure of the transmission/reception module 1 220_1, and may reflect the received edit data #3 and edit data #4 in a local document that is being edited.

Next, the transmission/reception module 2 220_2 may transmit the edit data #5 to each of the communication terminal 3 and the communication terminal 4 (S733). Therefore, each of the communication terminal 3 and the communication terminal 4 may reflect a document editing content (i.e., edit data #5) of the editor 1 in the local document.

According to the present embodiment, even though a failure occurs in the transmission/reception module 1 220_1, normal document update and transmission and reception of the edit data may be performed through the transmission/reception module 2 220_2 without loss of the edit data.

Figure 8:
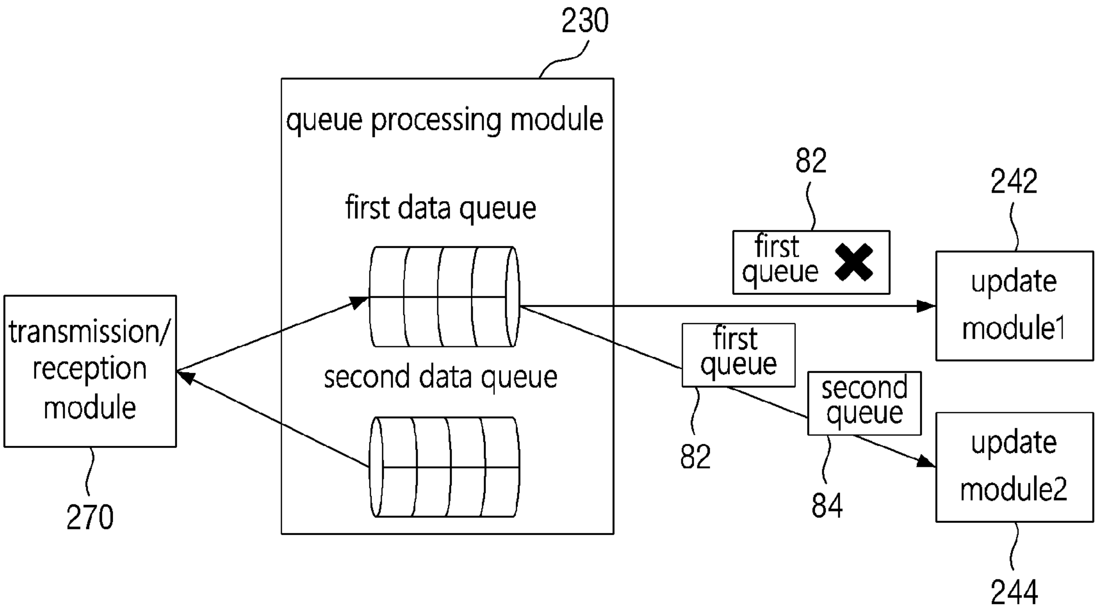
FIG. 8 is a view illustrating a document management system, which includes a dualized update module, in accordance with still another embodiment of the present disclosure.

FIG. 8 is a view illustrating a document management system, which includes a dualized update module, in accordance with still another embodiment of the present disclosure.

As shown in FIG. 8, the update modules 242 and 244 may be dualized. When a failure occurs while the update module 1 242 processes the edit data stored in the first data queue, the update module 2 244 may process the edit data which has not been processed by the update module 1 242.

FIG. 8 illustrates that the edit data stored in an odd-numbered sub-queue is processed by the update module 1 242 and the edit data stored in an even-numbered sub-queue is processed by the update module 2 244. In addition, as illustrated in FIG. 8, when the update module 1 242 fails to process the edit data stored in a first sub-queue 82 of the first data queue to cause a failure, the update module 2 244 may process the edit data included in the first sub-queue 82 as well as the edit data stored in a second sub-queue 84.

Figure 9:
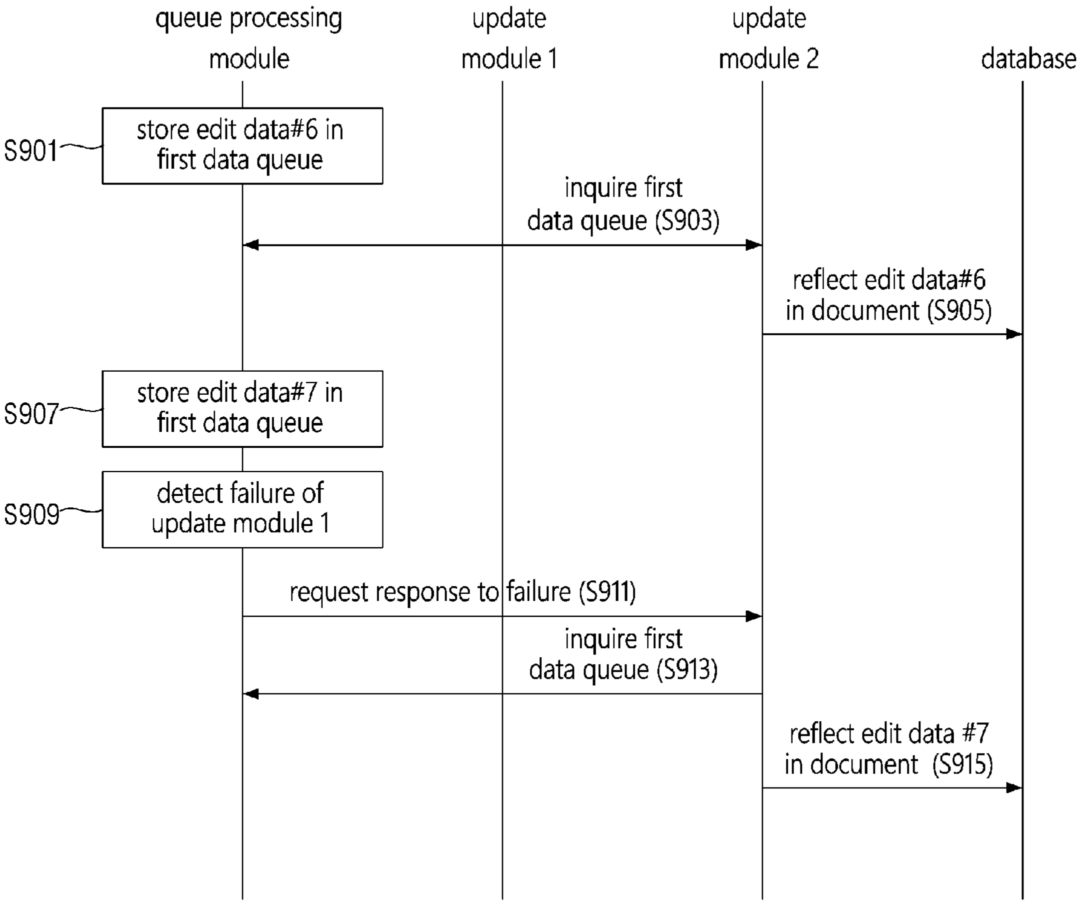
FIG. 9 is a signal flow chart illustrating the document management system of FIG. 8, which is operated by occurrence of a failure of an update module, in accordance with still another embodiment of the present disclosure.

FIG. 9 is a signal flow chart illustrating the document management system of FIG. 8, which is operated by occurrence of a failure of an update module, in accordance with still another embodiment of the present disclosure. In the description made with reference to FIG. 9, it is assumed that a failure occurs in the update module 1 242, the update module 1 242 is in charge of an odd-numbered sub-queue, and the update module 2 244 is in charge of an even-numbered sub-queue.

The queue processing module 230 may store the edit data #6 received from the transmission/reception module 220 in the second sub-queue of the first data queue (S901). The update module 2 244 may acquire the edit data #6 by inquiring the first data queue in response to storing the edit data #6 in the even-numbered sub-queue (S903). Subsequently, the update module 2 244 may update the document by reflecting the edit data #6 in the document stored in the database (S905). Additionally, the update module 2 244 may store the edit data #6 in the second data queue of the queue processing module 230. In this case, the edit data #6 stored in the second data queue may be transmitted to at least one communication terminal through the transmission/reception module 220.

In addition, the queue processing module 230 may store edit data #7 received from the transmission/reception module 220 in a third sub-queue of the first data queue (S907). However, the edit data #7 may not be processed due to the failure of the update module 1 242 that is in charge of the odd-numbered sub-queues. The queue processing module 230 may detect that a failure has occurred in the update module 1 242 when the processing for the edit data #7 is not completed for a preset time (S909).

In response to the occurrence of the failure of the update module 2 244, the queue processing module 230 may request a failure response to the update module 2 244 (S911). At this time, the queue processing module 230 may provide an index of the edit data #7, which has not been processed by the update module 1 242, to the update module 244.

Next, the update module 1 242 may acquire the edit data #7 stored in the third sub-queue, which is not processed by the update module 1 242, by inquiring the first data queue (S913). Subsequently, the update module 2 244 may update the document by reflecting the edit data #7 to the document stored in the database (S915). Additionally, the update module 2 244 may store the edit data #7 in the second data queue of the queue processing module 230. In this case, the edit data #7 stored in the second data queue may be transmitted to at least one communication terminal through the transmission/reception module 220.

According to the present embodiment, even though a failure occurs in the update module 1 242, a normal document update may be performed through the update module 2 244 without loss of the edit data.

Hereinafter, still another embodiment in which a module of a wireless management system is scaled out will be described with reference to FIGS. 10 to 13.

Figure 10:
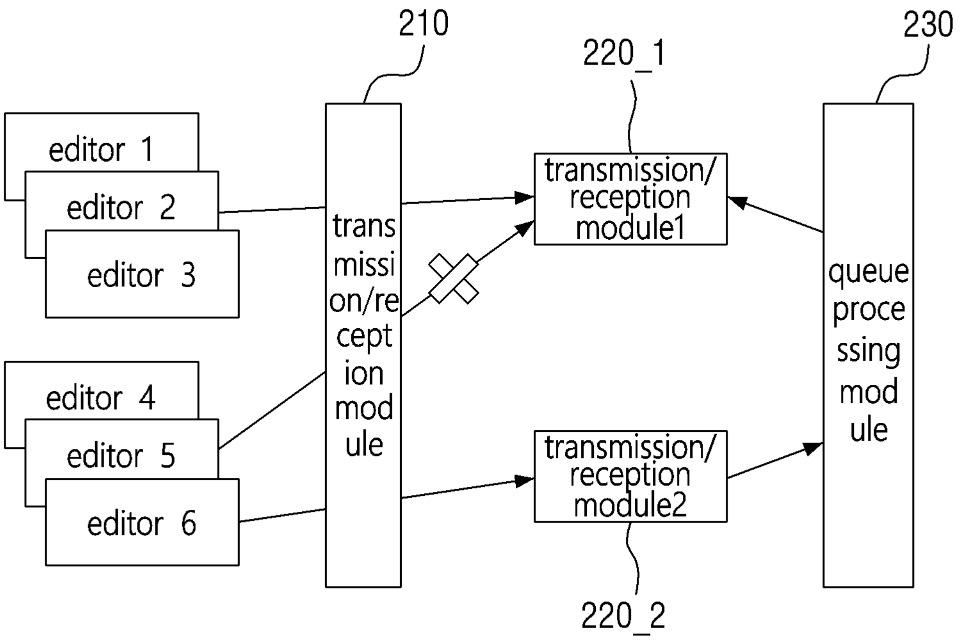
FIG. 10 is a view illustrating a session distributed when a transmission/reception module is scaled out, in accordance with still another embodiment of the present disclosure.

FIG. 10 is a view illustrating a session distributed when a transmission/reception module is scaled out, in accordance with still another embodiment of the present disclosure. As illustrated in FIG. 10, the transmission/reception module 1 220_1 may initially form a session with each of editors 1 to 6. In this case, forming a session with an editor may mean forming a session with a communication terminal used by the editor.

In this environment, the transmission/reception module 2 220_2 may be added. In this case, the editors 4 to 6 who are forming a session with the transmission/reception module 1 220_1 may switch the session from the transmission/reception module 1 220_1 to the transmission/reception module 2 220_2. Therefore, the transmission/reception module 1 220_1 may form a session with the editors 1 to 3 to process edit data generated in the editors 1 to 3. In addition, the transmission/reception module 2 220_2 may form a session with the editors 4 to 6 to process edit data generated in the editors 4 to 6.

Figure 11:
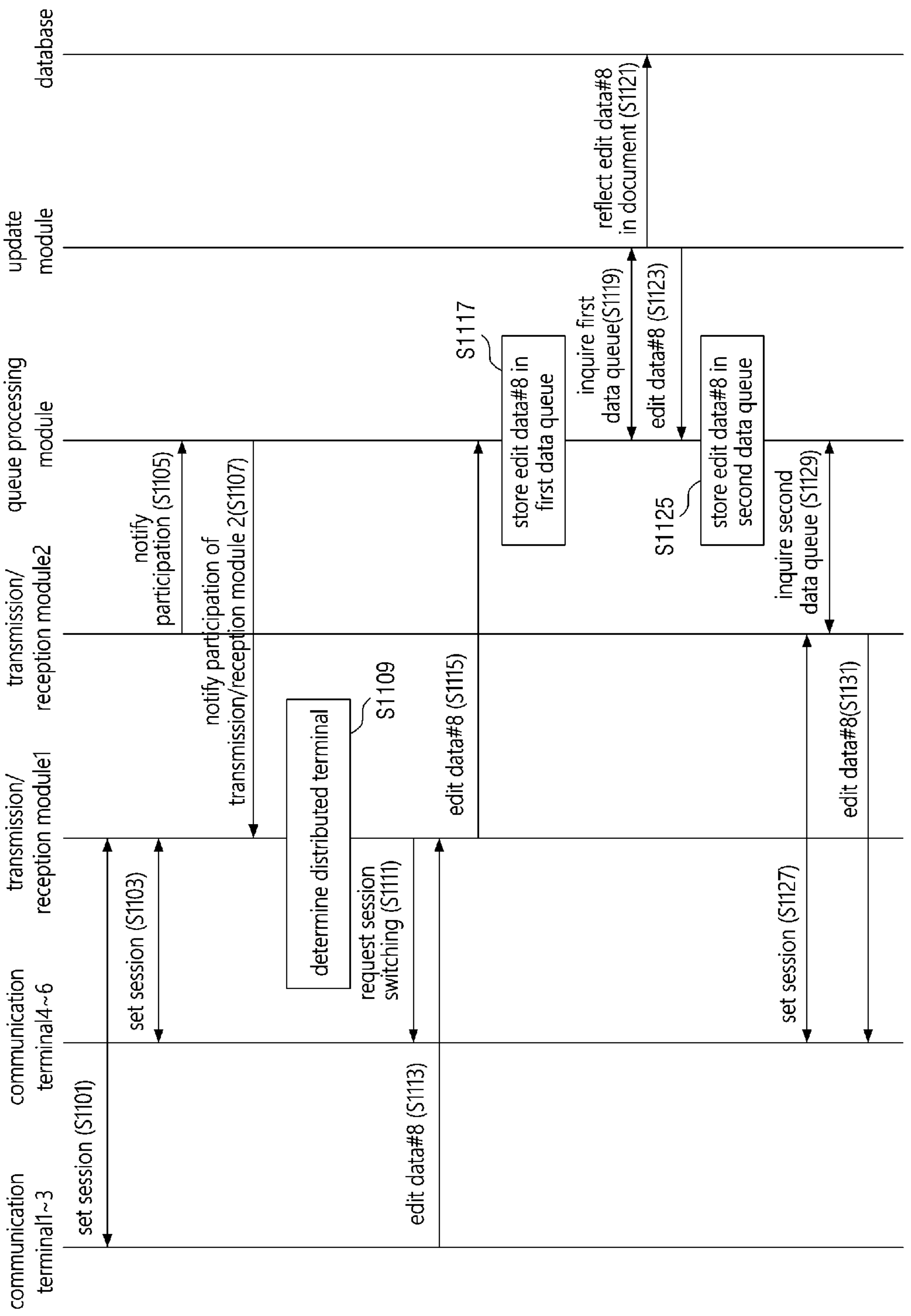
FIG. 11 is a signal flow chart illustrating an operation of a document management system when a transmission/reception module is scaled out, in accordance with still another embodiment of the present disclosure.

FIG. 11 is a signal flow chart illustrating an operation of a document management system when a transmission/reception module is scaled out, in accordance with still another embodiment of the present disclosure.

Referring to FIG. 11, the communication terminals 1 to 3 may form a session with the transmission/reception module 1 220_1 (S1101). In addition, the communication terminals 4 to 6 may also form a session with the transmission/reception module 1 220_1 (S1103).

In this way, in a state that the communication terminals 1 to 6 form a session with the transmission/reception module 1 220_1, the transmission/reception module 2 220_2 may be added to the document management system, or the transmission/reception module 2 220_2 may be recovered from the failure. In this case, the transmission/reception module 2 220_2 may transmit a participation notification message to the queue processing module 230 (S1105).

Next, the queue processing module 230 may transmit the participation notification message for the transmission/reception module 2 220_2 to the transmission/reception module 1 220_1 (S1107). At this time, the queue processing module 230 may transmit identification information (e.g., IP address) of the transmission/reception module 2 220_2 to the transmission/reception module 1 220_1.

Subsequently, the transmission/reception module 1 220_1 may determine some of terminals being session-connected thereto as distribution terminals (S1109). In FIG. 11, it is described that the transmission/reception module 1 220_1 determines communication terminals 4 to 6 as the distribution terminals. Next, the transmission/reception module 1 220_1 may transmit, to each of the communication terminals 4 to 6 determined as the distribution terminals, a session switching request message that includes identification information (e.g., IP address) of the transmission/reception module 2 220_2. Therefore, the communication terminals 4 to 6 may initiate a process of switching a session from the transmission/reception module 1 220_1 to the transmission/reception module 2 220_2.

However, before the session switching is completed by the communication terminals 4 to 6, edit data #8 may be transmitted to the transmission/reception module 1 220_1 through at least one of the communication terminals 1 to 3 (S1113). In this case, the transmission/reception module 1 220_1 may transmit the edit data #8 to the queue processing module 230 (S1115), and the queue processing module 230 may store the edit data #8, which includes an index and editor identification information, in the first data queue (S1117).

Subsequently, the update module may acquire the edit data #8 by inquiring the first data queue (S1119). Next, the update module may update the document by reflecting the edit data #8 in the document stored in the database (S1121). When the document update is completed, the update module may transmit the updated edit data #8 to the queue processing module 230 (S1123). Subsequently, the queue processing module 230 may store the edit data #8 in the second data queue (S1125).

When the edit data #8 is stored in the second data queue, the transmission/reception module 1 220_1 may acquire the edit data #8 from the second data queue and transmit the acquired edit data #8 to some or all of the communication terminals 1 to 3. At this time, the transmission/reception module 1 220_1 may transmit the edit data #8 to the remaining communication terminals except for the communication terminal that has transmitted the edit data #8.

The communication terminals 4 to 6 that have released the session with the transmission/reception module 1 220_1 may form a session with the transmission/reception module 2 220_2 (S1127). When the session is completely formed, the transmission/reception module 2 220_2 may acquire the edit data #8 by inquiring the second data queue (S1129). Then, the transmission/reception module 2 220_2 may transmit the acquired edit data #8 to each of the communication terminals 1 to 3 (S1131).

According to the present embodiment, scale-out of the transmission/reception module may be normally performed even without interruption of the document management system. In addition, according to the present embodiment, even though edit data is generated while the transmission/reception module is being added in accordance with scale-out, the edit data may be reflected in the document without loss, and may be stably provided to another editor.

Figure 12:
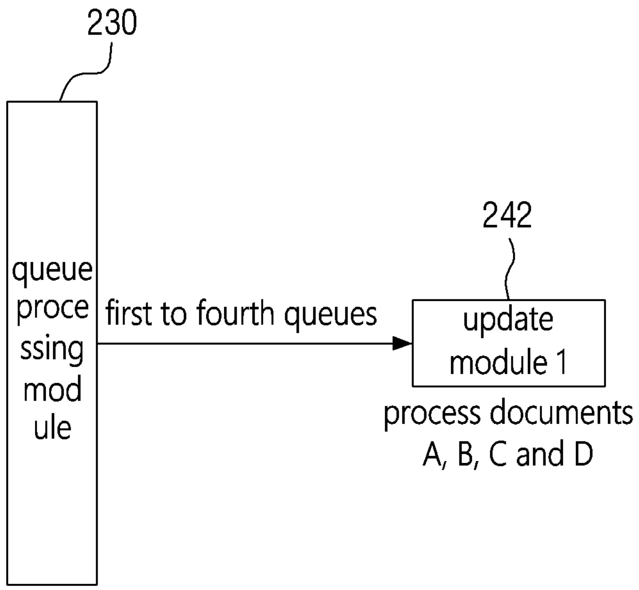
FIG. 12 is a view illustrating a serve queue distributed when an update module is scaled out, in accordance with still another embodiment of the present disclosure.
Figure 12:
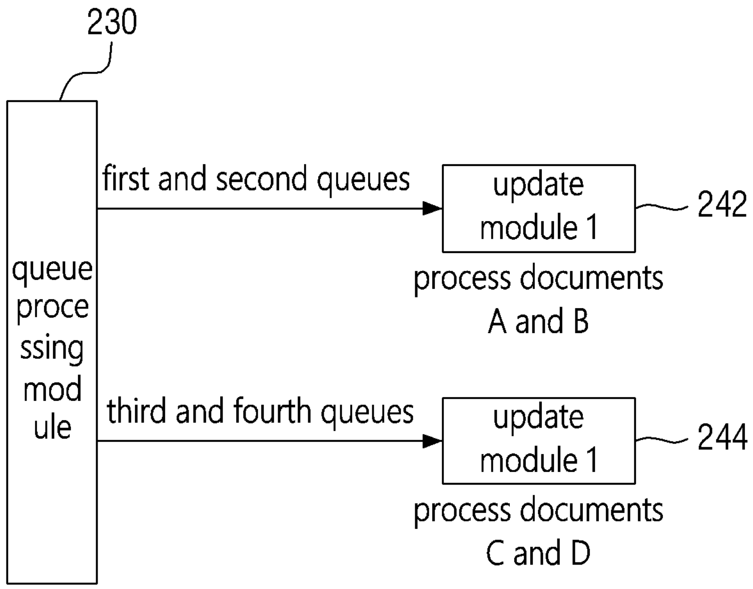

FIG. 12 is a view illustrating a serve queue distributed when an update module is scaled out, in accordance with still another embodiment of the present disclosure. As illustrated in a reference numeral 1210 of FIG. 12, the update module 1 242 may be in charge of documents A, B, C and D corresponding to first to fourth sub-queues, and may process editing for the documents A, B, C and D.

In this system environment, the update module 2 244 may be added as illustrated in a reference numeral 1220 of FIG. 12. In this case, the third sub-queue and the fourth sub-queue, for which the update module 1 242 is responsible, may be distributed to the update module 2 244. Therefore, the update module 1 242 may process editing for the document A and the document B, which correspond to the first sub-queue and the second sub-queue, and the update module 2 244 may process editing for the document C and the document D, which correspond to the third sub-queue and the fourth sub-queue.

Figure 13:
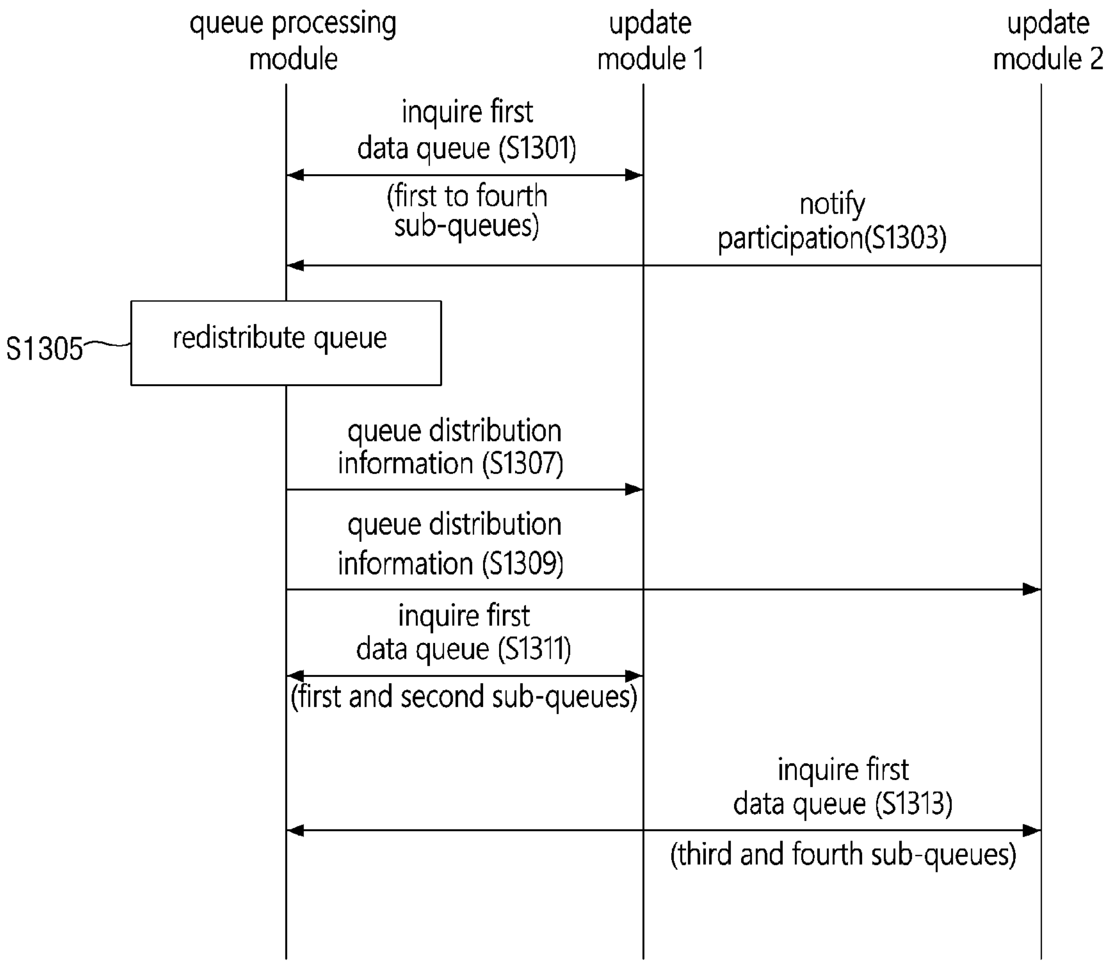
FIG. 13 is a signal flow chart illustrating a document management system of FIG. 12 when an update module is scaled out, in accordance with still another embodiment of the present disclosure.

FIG. 13 is a signal flow chart illustrating a document management system of FIG. 12 when an update module is scaled out, in accordance with still another embodiment of the present disclosure.

Referring to FIG. 13, the update module 1 242 may inquire the first to fourth sub-queues for which it is responsible (S1301). When the update module 1 242 acquires the edit data for the documents A to D from the first to fourth sub-queues, the update module 1 242 may perform subsequent processes (i.e., updating the document and storing the edit data in the second data queue).

The update module 2 244 may be added to the system environment or recovered from the failure to transmit the participation notification message to the queue processing module 230 (S1303). Then, the queue processing module 230 may redistribute the sub-queues. In FIG. 13, it is assumed that the first and second sub-queues are sub-queues for which the update module 1 242 is responsible, and the third and fourth sub-queues are sub-queues for which the update module 2 244 is responsible. Subsequently, the queue processing module 230 may transmit queue distribution information, which includes the first sub-queue and the second sub-queue, to the update module 1 242 (S1307). In addition, the queue processing module 230 may transmit queue distribution information, which includes the third sub-queue and the fourth sub-queue, to the update module 1 242 (S1309).

Subsequently, the update module 1 242 may be responsible for the first sub-queue and the second sub-queue based on the received queue distribution information. That is, the update module 1 242 may acquire edit data for the documents A and B by inquiring the first sub-queue and the second sub-queue in the first data queue (S1311). When the edit data is acquired, the update module 1 242 may reflect the edit data in at least one of the document A or the document B by using the acquired edit data.

The update module 2 244 may be responsible for the third sub-queue and the fourth sub-queue based on the received queue distribution information. That is, the update module 1 242 may acquire the edit data for the documents C and D by inquiring the third sub-queue and the fourth sub-queue in the first data queue (S1313). When the edit data is acquired, the update module 2 244 may reflect the edit data in at least one of the document C or the document D by using the acquired edit data.

According to the present embodiment, scale-out for the update module may be stably performed without data loss even without interruption of the operation of the document management system.

Figure 14:
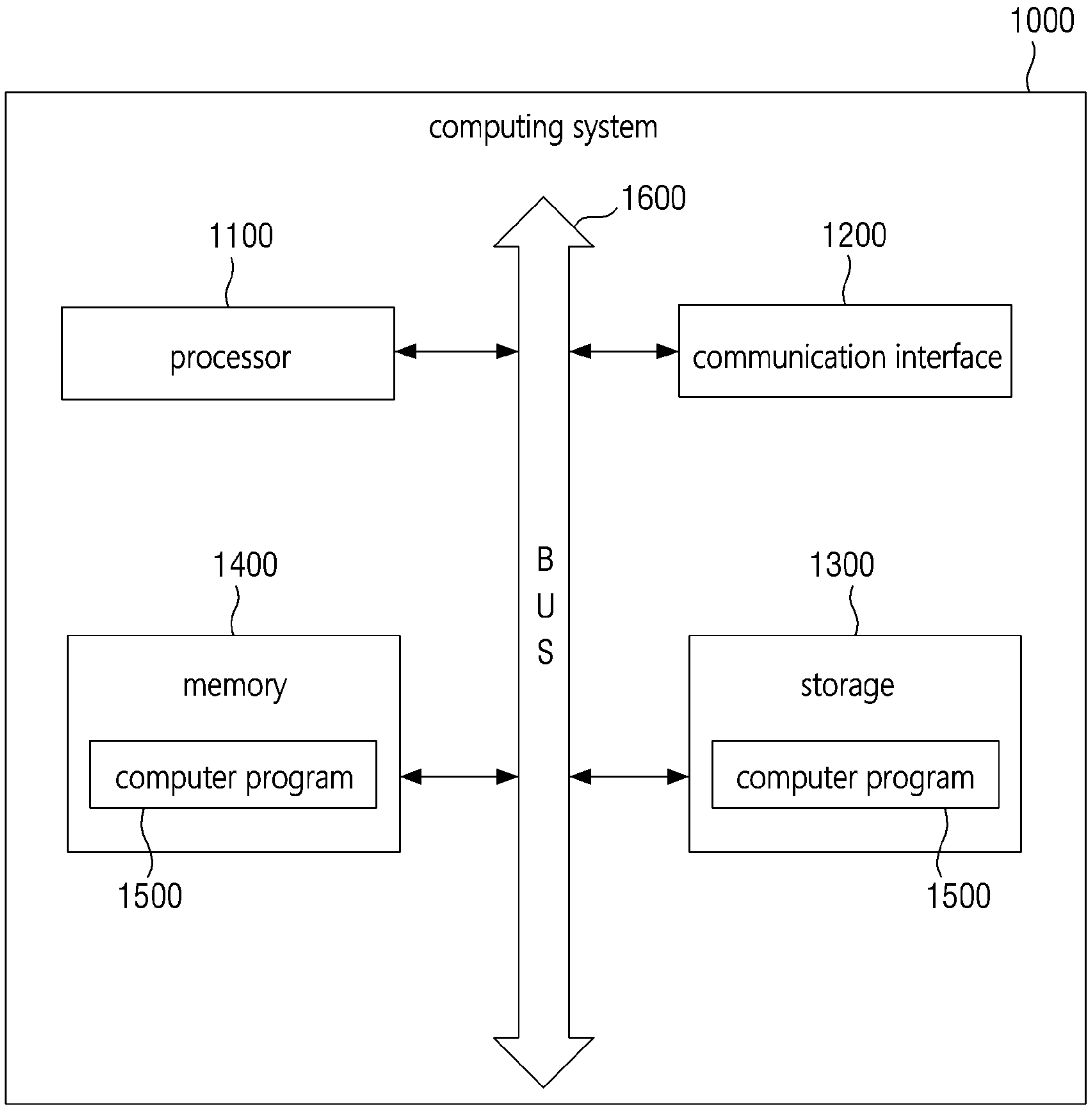
FIG. 14 is a hardware schematic view illustrating a computing system according to some embodiments of the present disclosure.

FIG. 14 is a hardware schematic view illustrating a computing system according to some embodiments of the present disclosure. The computing system 1000 shown in FIG. 14 may include one or more processors 1100, a system bus 1600, a communication interface 1200, a memory 1400 for loading a computer program 1500 performed by the processor 1100, and a storage 1300 for storing the computer program 1500.

The processor 1100 controls the overall operation of each component of the computing system 1000. The processor 1100 may perform an operation for at least one application or program for executing the method/operation according to various embodiments of the present disclosure. The memory 1400 stores various data, commands and/or information. The memory 1400 may load one or more computer programs 1500 from the storage 1300 to execute the method/operations according to various embodiments of the present disclosure. The storage 1300 may non-temporarily store one or more computer programs 1500. The computer program 1500 may include one or more instructions in which the method/operations according to various embodiments of the present disclosure are implemented. When the computer program 1500 is loaded into the memory 1400, the processor 1100 may execute the one or more instructions to perform the method/operations according to various embodiments of the present disclosure.

In some embodiments, the computing system 1000 described with reference to FIG. 14 may be configured using one or more physical servers included in a server farm based on a cloud technology such as a virtual machine. In this case, among the components shown in FIG. 14, at least some of the processor 1100, the memory 1400 and the storage 1300 may be virtual hardware, and the communication interface 1200 may be also configured as a virtualized networking component such as a virtual switch.

According to one embodiment, the computer program 1500 may include instructions for performing an operation of storing first edit data received from a first communication terminal in a first data queue, an operation of storing second edit data received from a second communication terminal in the first data queue, an operation of updating an online document by reflecting the first and second edit data stored in the first data queue in the online document, an operation of transmitting the first edit data to the second communication terminal, and an operation of transmitting the second edit data to the first communication terminal.

So far, a variety of embodiments of the present disclosure and the effects according to embodiments thereof have been mentioned with reference to FIGS. 1 to 14. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method for providing an edit service of a document in a document management system including at least two transmission/reception modules and a transmission/reception processing module configured to perform load balancing for traffic generated by the at least two transmission/reception modules, the method being performed by at least one processor, and comprising:

storing, in a first data queue, first edit data received from a first communication terminal via a first transmission/reception module according to load-balancing of the transmission/reception processing module;

storing, in the first data queue, second edit data received from a second communication terminal via a second transmission/reception module according to the load-balancing of the transmission/reception processing module;

updating an online document by reflecting the first edit data and the second edit data stored in the first data queue in the online document;

transmitting, via the second transmission/reception module, the first edit data to the second communication terminal;

transmitting, via the first transmission/reception module, the second edit data to the first communication terminal; and based on detection, by the transmission/reception processing module, of a failure in the first transmission/reception module, transmitting the second edit data previously transmitted via the first transmission/reception module, to the first communication terminal via the second transmission/reception module.

2. The method of claim 1, wherein the updating the online document includes:

merging the first edit data and the second edit data into one edit data; and reflecting the merged edit data in the document.

3. The method of claim 1, wherein the updating the online document includes storing the first edit data and the second edit data in a second data queue based on the updating of the online document being completed, each of the first edit data and the second edit data being stored in association with editor identification information, among the edit data stored in the second data queue, the second edit data that is not associated with an editor of the first communication terminal is transmitted to the first communication terminal, and among the edit data stored in the second data queue, the first edit data that is not associated with an editor of the second communication terminal is transmitted to the second communication terminal.

4. The method of claim 3, wherein the first data queue is a reception-only queue in which received edit data are stored, and the second data queue is a transmission-only queue in which edit data are stored before being transmitted to a communication terminal.

5. The method of claim 1, wherein the first data queue stores the first edit data and the second edit data in association with identification information of the document, and the updating the online document includes:

acquiring the first edit data and the second edit data from the first data queue based on identification information of the document; and reflecting the first edit data and the second edit data in the document.

6. The method of claim 5, wherein the storing the first edit data in the first data queue includes storing the first edit data in a sub-queue corresponding to the identification information of the document among a plurality of sub-queues included in the first data queue, and the storing the second edit data in the first data queue includes storing the first edit data in the sub-queue.

7. A document management system for providing an edit service of an online document, the document management system comprising at least one processor to read and operate according to computer program to implement:

at least two transmission/reception modules configured to receive edit data from at least two communication terminals;

a transmission/reception processing module configured to perform load balancing for traffic generated by the at least two transmission/reception modules;

a queue processing module configured to store, in a first data queue, edit data received by a first communication terminal via a first transmission/reception module according to according to load-balancing of the transmission/reception processing module; and at least one update module configured to acquire edit data stored in the first data queue, reflect the acquired edit data in the online document, and store edit data, which has been reflected in the online document, in a second data queue, wherein a second transmission/reception module is configured to transmit the edit data stored in the second data queue to a second communication terminal according to the load-balancing of the transmission/reception processing module, and wherein, based on detection, by the transmission/reception processing module, of a failure in the second transmission/reception module, the first transmission/reception module is configured to transmit the edit data in the second data queue previously transmitted by the second transmission/reception module, to the second communication terminal.

8. The document management system of claim 7, wherein the first transmission/reception module is configured to, based on the failure in the second transmission/reception module:

receive, from the second communication terminal, an index related to the edit data received by the second communication terminal, acquire edit data, which is to be transmitted, from the second data queue based on the received index, and transmit the edit data, acquired based on the received index, to the second communication terminal.

9. The document management system of claim 8, wherein the second data queue stores the edit data associated with a second editor, which has been reflected in the online document, and the first transmission/reception module is configured to acquire the edit data associated with the second editor from the second data queue, and transmit the acquired edit data associated with the second editor to the first communication terminal.

10. The document management system of claim 7, wherein the at least one update module includes a first update module configured to process edit data of a first document stored in the first data queue, and a second update module configured to process edit data of a second document stored in the first data queue, and based on a failure occurring in the second update module, the first update module is configured to acquire the edit data of the second document from the first data queue.

11. The document management system of claim 10, wherein the first data queue includes a first sub-queue associated with the first document and a second sub-queue associated with the second document, and based on edit data stored in the first sub-queue being not processed for a threshold time period, it is determined that a failure has occurred in the first update module.

12. A document management system for providing an edit service of an online document, the document management system comprising at least one processor to read and operate according to computer program to implement:

a first transmission/reception module configured to receive edit data from a plurality of communication terminals;

a queue processing module configured to store the received edit data;

an update module configured to acquire the edit data stored in the queue processing module and reflect the acquired edit data in an online document; and a second transmission/reception module newly added by scale-out, wherein, after the scale-out:

a second group including at least one communication terminal allocated to the second transmission/reception module, among the plurality of communication terminals previously allocated to the first transmission/reception module, is determined, the first transmission/reception module is configured to transmit a session switching request message to the at least one communication terminal included in the second group, release a session with the at least one communication terminal included in the second group, and receive edit data from a communication terminal of a first group excluding the second group among the plurality of communication terminals, and the second transmission/reception module is configured to establish a session with the at least one communication terminal of the second group and receive edit data from the at least one communication terminal of the second group.

13. The document management system of claim 12, wherein the session switching request message includes identification information of the second transmission/reception module.

14. The document management system of claim 12, wherein the update module is configured to reflect edit data of the first group, which is received from the communication terminal of the first group, in the online document, and store the edit data of the first group, which has been reflected in the online document, in a second data queue included in the queue processing module, and the second transmission/reception module is configured to acquire the edit data of the first group from the second data queue and transmit the acquired edit data of the first group to the at least one communication terminal included in the second group.

15. A document management system for providing an edit service of an online document, the document management system comprising at least one processor to read and operate according to computer program to implement:

a transmission/reception module configured to receive edit data from a plurality of communication terminals;

a queue processing module configured to store the received edit data;

a first update module configured to acquire edit data for a plurality of documents, which are stored in the queue processing module, and reflect the acquired edit data in each online document stored in a database included in the document management system; and a second update module newly added by scale-out, wherein, after the scale-out:

a second group, which includes at least one document allocated to the second update module, among the plurality of documents previously allocated to the first update module, is determined, the first update module is configured to acquire edit data of a first group, which is related to at least one document of the first group excluding the second group among the plurality of documents, from the queue processing module and reflect the acquired edit data of the first group in the document of the first group, and the second update module is configured to acquire edit data of the second group, which is related to a document of the second group among the plurality of documents, from the queue processing module and reflect the acquired edit data of the second group in the document of the second group.

16. The document management system of claim 15, wherein the queue processing module includes at least one first sub-queue related to the document of the first group, and at least one second sub-queue associated with the document of the second group, the first update module is configured to acquire the edit data of the first group by accessing the at least one first sub-queue, and the second update module is configured to acquire the edit data of the second group by accessing the at least one second sub-queue.

17. A computing system for use in a document management system including at least two transmission/reception modules and a transmission/reception processing module configured to perform load balancing for traffic generated by the at least two transmission/reception modules, the computing system comprising:

at least one processor; and at least one memory configured to store computer program, wherein the computer program is executable by the at least one processor to cause the at least one processor to perform:

storing, in a first data queue, first edit data received from a first communication terminal via a first transmission/reception module according to load-balancing of the transmission/reception processing module;

storing, in the first data queue, second edit data received from a second communication terminal via a second transmission/reception module according to the load-balancing of the transmission/reception processing module;

updating an online document by reflecting the first edit data and the second edit data stored in the first data queue in the online document;

transmitting, via the second transmission/reception module, the first edit data to the second communication terminal;

transmitting, via the first transmission/reception module, the second edit data to the first communication terminal; and based on detection, by the transmission/reception processing module, of a failure in the first transmission/reception module, transmitting the second edit data previously transmitted via the first transmission/reception module, to the first communication terminal via the second transmission/reception module.

* * * * *